United States Patent [19]

Heslin

[11] Patent Number: 4,799,147
[45] Date of Patent: Jan. 17, 1989

[54] ON CHIP SIGNAL SELECTION METHOD AND APPARATUS

[75] Inventor: Peter M. Heslin, Natick, Mass.

[73] Assignee: Honeywell Bull Inc., Waltham, Mass.

[21] Appl. No.: 31,318

[22] Filed: Mar. 26, 1987

[51] Int. Cl.⁴ .................................................. G06F 1/00
[52] U.S. Cl. ....................................................... 364/200
[58] Field of Search ......................... 364/200, 300, 900

[56] References Cited

U.S. PATENT DOCUMENTS 4,694,391 9/1937 Guttag et al. ..................... 364/200

Primary Examiner—Raulfe B. Zache
Attorney, Agent, or Firm—Fath F. Driscoll; John S. Solakian

[57] ABSTRACT

A microprocessor integrated circuit chip includes a plurality of functional areas containing a large number of widely distributed signal sources. An on-chip selection network is distributed on the chip which enables the selection of signals from the large number of sources under microinstruction control without any decrease in chip performance. The network includes an access bus which is distributed to the functional areas as a function of the concentration of signals provided by the sources. Individual decoders are strategically located on the chip and connect in common to a control bus. Each decoder connects to a plurality of switches for linking the sources of a functional area to the access bus. A selector circuit terminates the access bus at one end. Under microprogram control, the selector circuit is enabled to select which final source signal is applied to the functional area containing branching circuits for selecting a next microinstruction to be executed by the microprocessor.

31 Claims, 14 Drawing Sheets

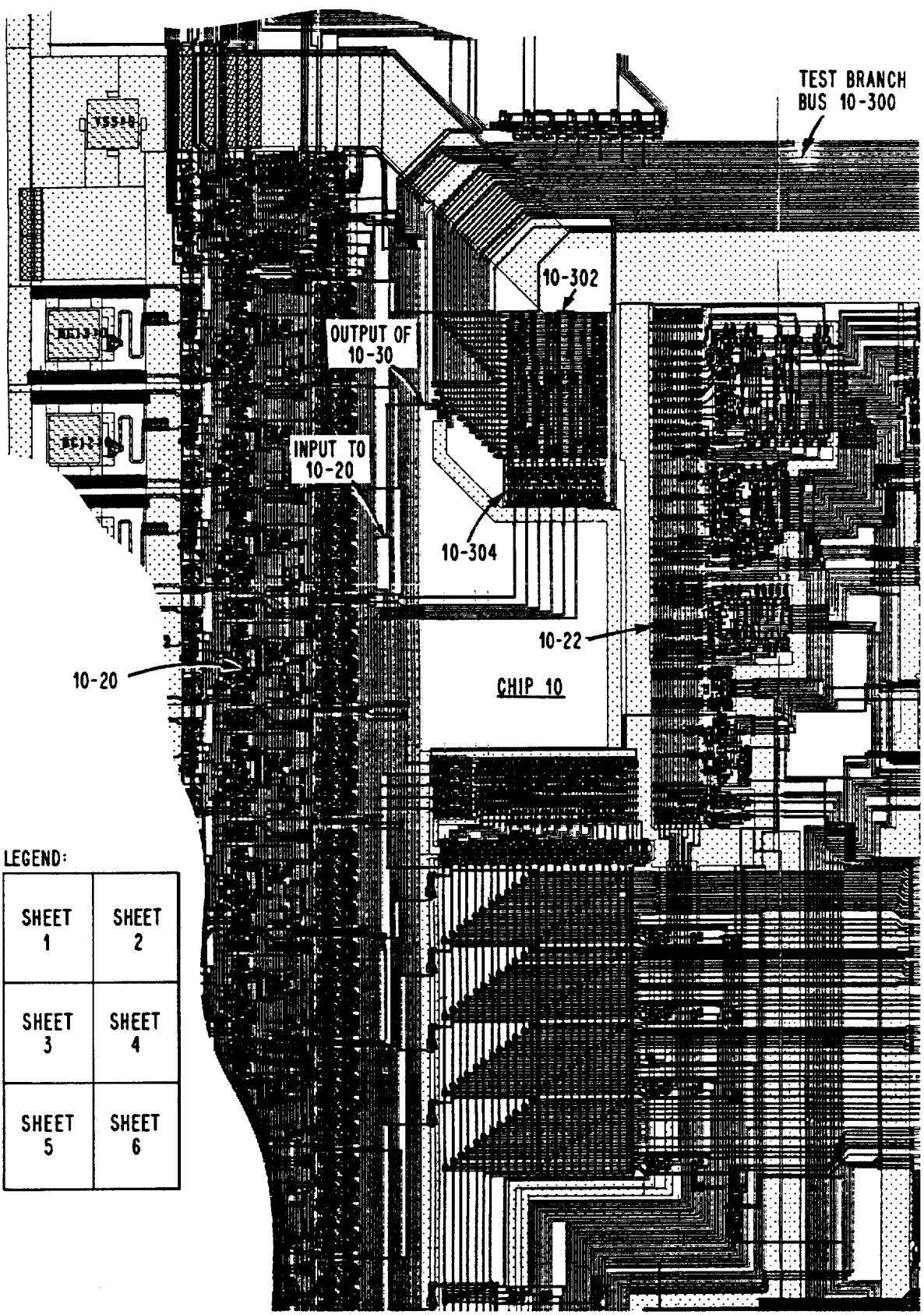
Fig. 2. (sheet 1 of 6)

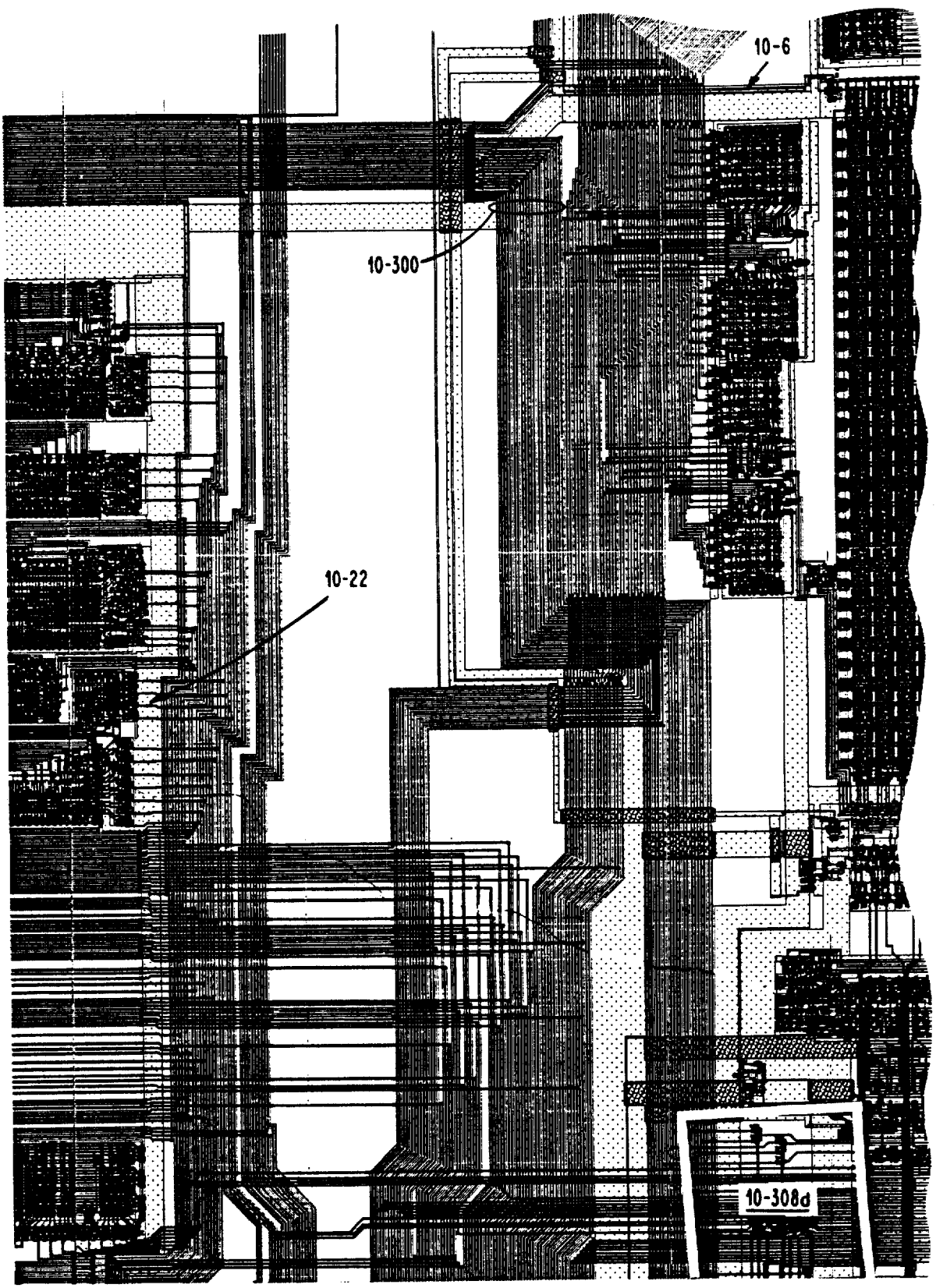
Fig. 2 (sheet 2 of 6)

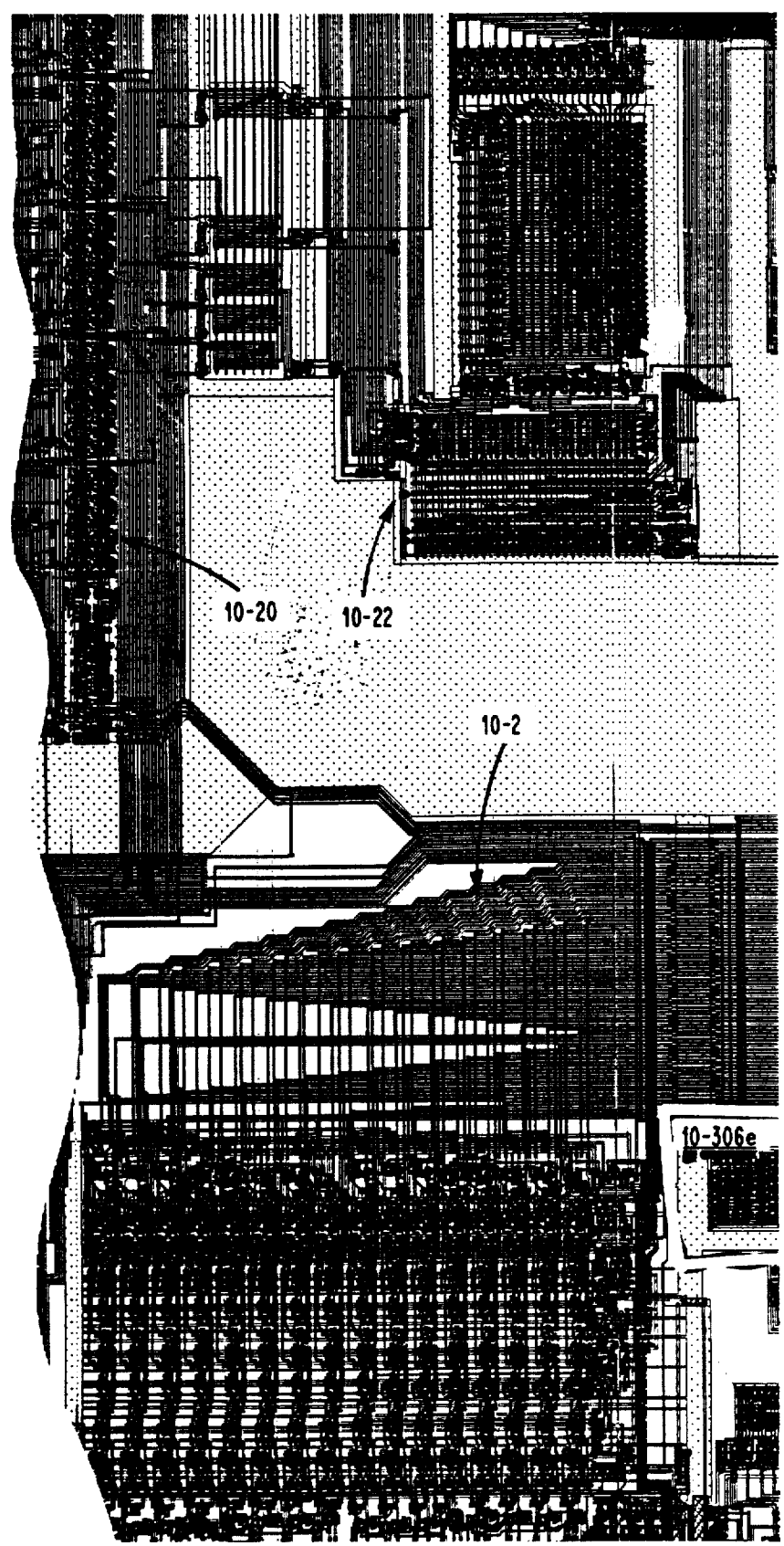
Fig. 2. (sheet 3 of 6)

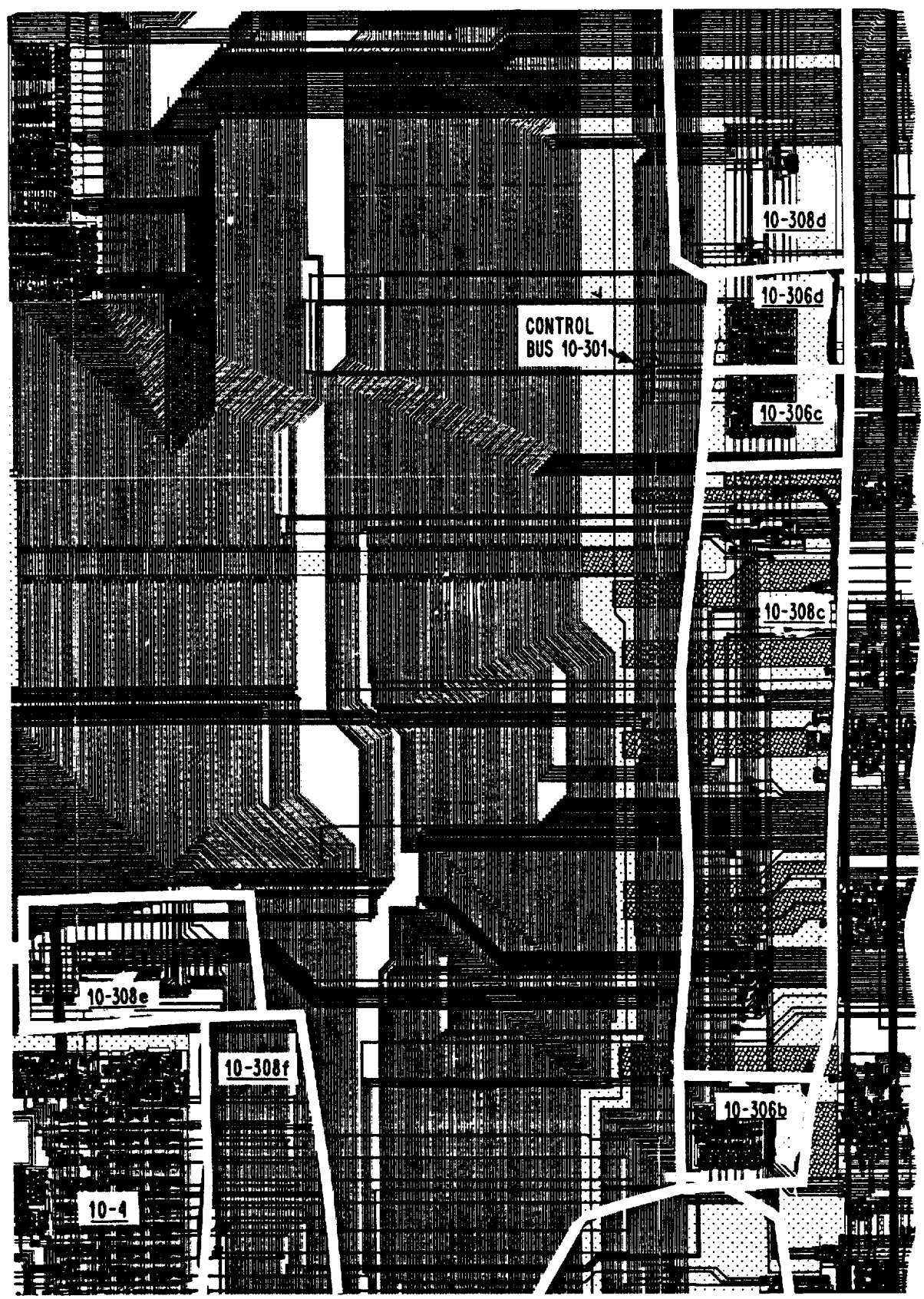
Fig. 2. (sheet 4 of 6)

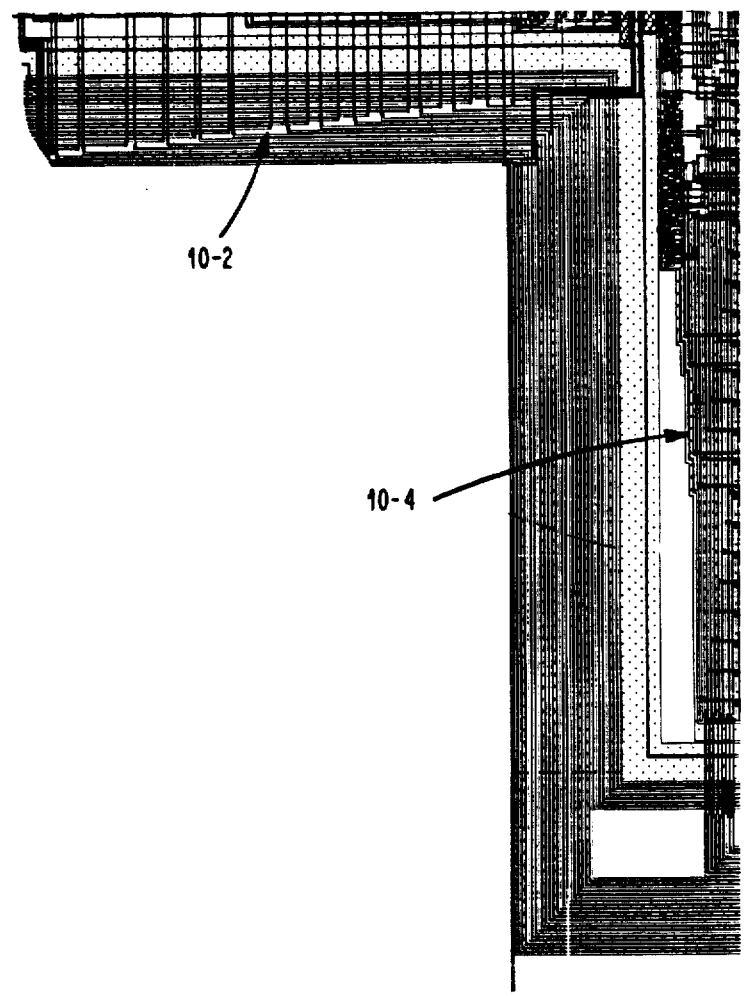
Fig. 2. (sheet 5 of 6)

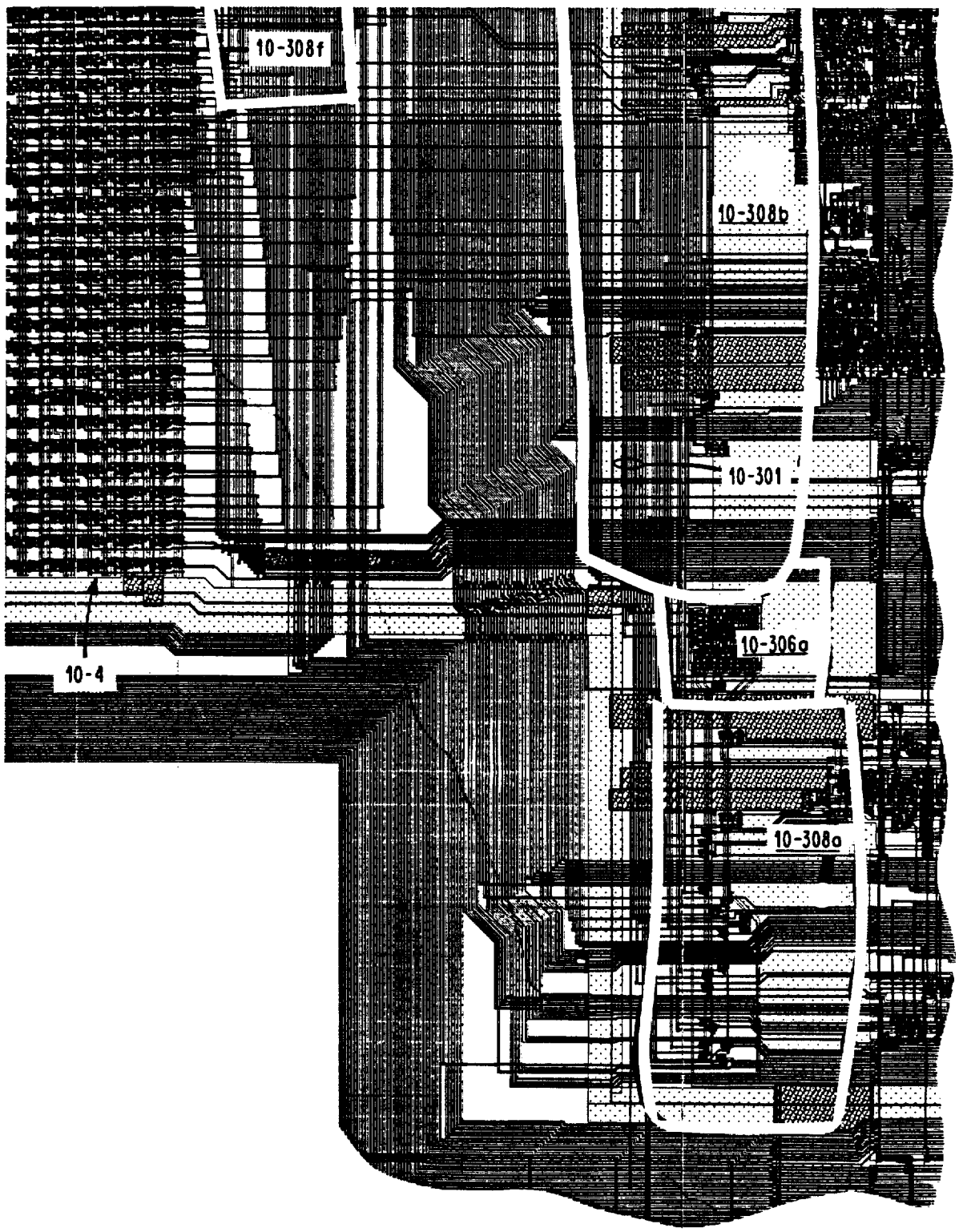
Fig. 2. (sheet 6 of 6)

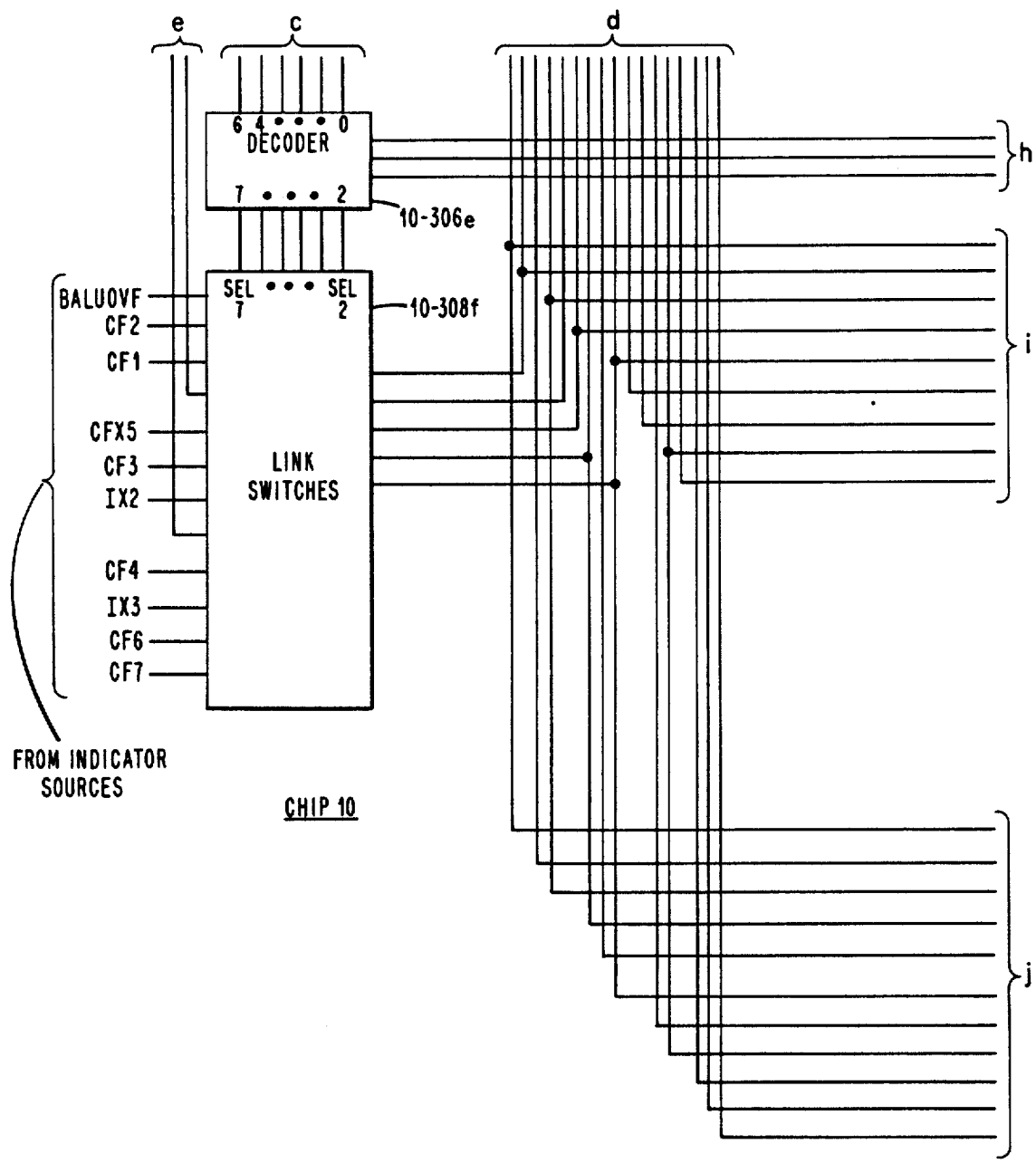
Fig. 3. (sheet 3 of 4)

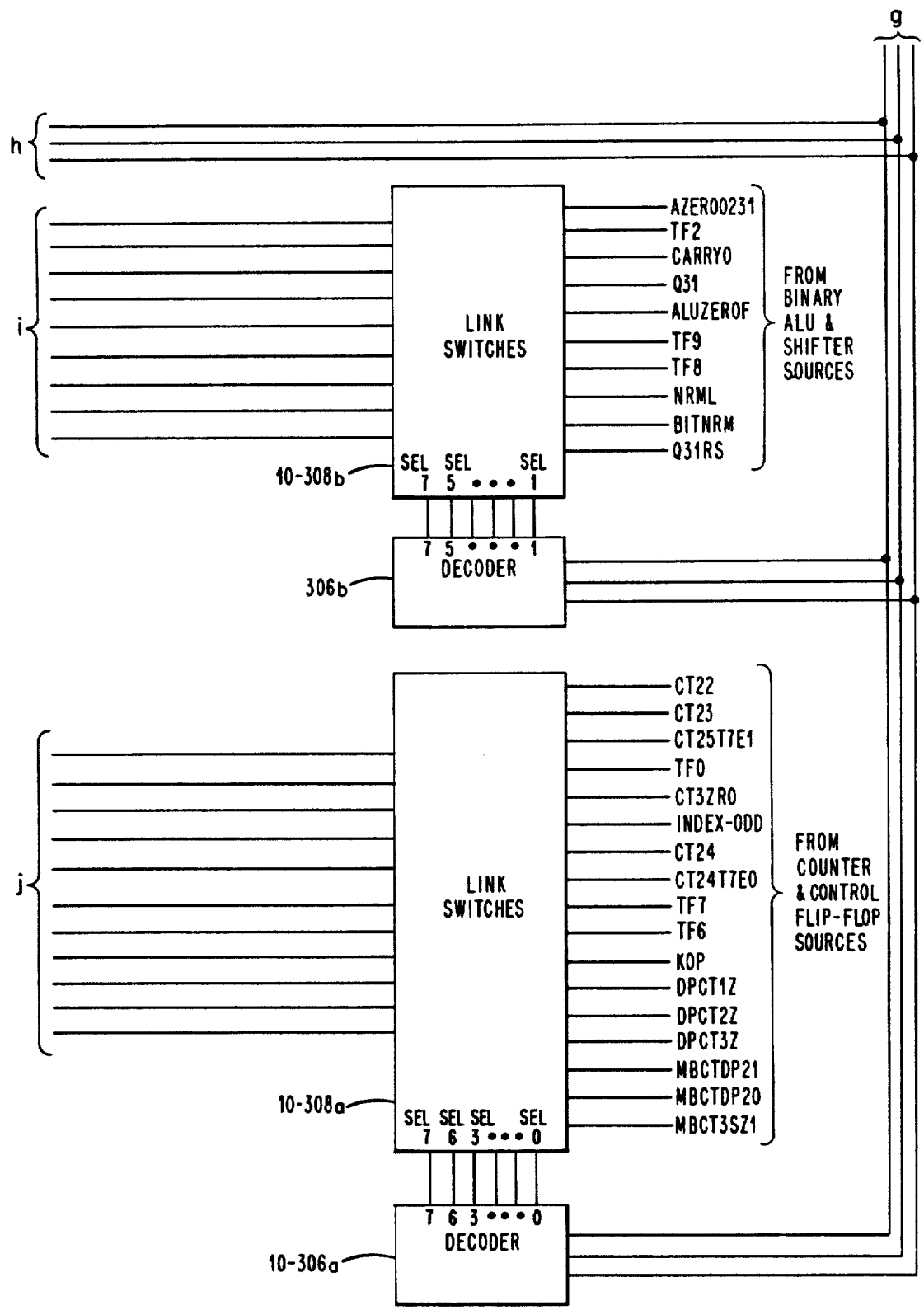
Fig.3. (sheet 4 of 4)

ON CHIP SIGNAL SELECTION METHOD AND APPARATUS

RELATED PATENT APPLICATIONS

1. "Multiprocessors on a Single Semiconductor Chip," invented by Thomas F. Joyce, Richard P. Kelly, Jian-Kuo Shen and Michel M. Raguin, bearing Ser. No. 06/722,237, filed on Apr. 11, 1985 which is assigned to the same assignee as named herein.

BACKGROUND OF THE INVENTION

1. Field of Use

This invention relates to integrated circuit chip devices and more particularly to selecting signals from a plurality of sources located on an integrated circuit chip.

2. Prior Art

As well known, today's integrated circuit chips are becoming more and more complex as they are designed to provide greater processing capabilities. In the case of microprocessor chips, a particularly complex area is the branch control or address generation circuitry. These circuits are required to select an address specifying the next instruction to be executed by the microprocessor. In order to provide flexibility, such selection is based upon the occurrence of conditions occurring within a current processing cycle of operation. The conditions correspond to signals received from other sections or parts of the microprocessor chip.

In the past, such next address generation or branching circuits have been implemented using combinations of matrices or multiplexer circuits. An example of such an arrangement is disclosed in U.S. Pat. No. 3,955,180. While this approach has been useful in implementing microprogrammed processors constructed from discrete components, it can be wasteful of chip area unless the sources of the signals requiring examination are concentrated within a few areas.

Thus, it has been found that in complex chips where large numbers of signal sources requiring examination are widely distributed over the entire area of the chip, large areas normally have to be allocated for making such signal selections. Chip space requirements are further increased where the chip includes several processing elements. An example of such an arrangement is disclosed in the related copending patent application of Thomas F. Joyce, et al. entitled, "Multiprocessors on a Single Semiconductor Chip," Ser. No. 06/722,237, filed on Apr. 11, 1985.

Accordingly, it is a primary object of the present invention to provide a method and apparatus which permits the on-chip selection of signals generated by a large number of widely distributed sources.

It is a further object of the invention to provide a method and apparatus which permits on-chip signal selection without any decrease in microprocessor performance.

SUMMARY OF THE INVENTION

The above objects are achieved by the method and apparatus of the present invention. The present invention provides for the on-chip selection of signals received from a large number of sources which are distributed throughout the area of a microprocessor integrated circuit chip. In the preferred embodiment, the area of the chip is divided into a plurality of functional areas or regions. A decoder circuit is strategically located in at least one functional area as close as possible to the sources of signals within the area. A plurality of lines of an access bus are distributed throughout the chip functional areas as a function of the concentration of the source signals within each area for transmitting the source signals to a predetermined part of the chip for final selection.

The apparatus of the invention further includes a number of pluralities of linking switches, each plurality for connecting the sources of a functional area to the access bus. The linking switches which are constructed from pass transistors are enabled by signals from its associated decoder circuit to apply source signals to the access bus lines.

Each decoder circuit is connected in common to a control bus which distributes a set of control signals to all decoder circuits. In the preferred embodiment, the set of control signals corresponds to a predetermined portion of a test control field of the chip's microinstruction word. To facilitate layout and performance efficiency, the control bus is positioned adjacent to the access bus.

At the rear of back part of the chip, the access bus lines are determinated in a selector circuit. The selector circuit, in response to signals from an associated selector decoder circuit, selects the final output signal from one of the sources specified by the test control field for use by the chip's address generation circuits in selecting the next microinstruction to be executed by the microprocessor. In the preferred embodiment, the selector decoder circuit is connected to receive other signals from the test control field in addition to signals from indicator storage circuits which define the type of operation currently being performed by the microprocessor. This is done in order to service local conditions and to resolve any testing conflicts.

In the preferred embodiment, the microprocessor chip includes separate processors for executing binary, decimal and floating point operations. The types of operations performed by these processors are described in the related copending patent application of Thomas F. Joyce, et al. titled, "Microprocessors on a Single Semiconductor Chip." In operation, in response to the control signals applied by the control bus, the decoders associated with the areas, enable their respective linking switches to apply signals from the corresponding sources to different predetermined ones of the access bus lines for final selection by the selector circuit.

In the preferred embodiment, as a function of the type of operation being performed and the states of the signals from the test control field, the selector decoder generates an output signal which conditions the selector circuit to select the bus access line which is to provide the final source signal to be examined or tested by the microprocessor next address generation circuits. Additionally, the selector circuit also includes input means for enabling the selection of signals from local sources which do not require connection to the access bus. Thus, the arrangement of the present invention also provides for the selection of signals from localized as well as remotely located sources.

The arrangement of the present invention reduces considerably, the chip area required to carry out the selection of a source signal from the large number of sources widely distributed throughout the chip. Since each line of the access bus can be assigned a number of source signals, this provides additional flexibility. In the preferred embodiment, the number of source signals which can be connected to each line corresponds to $2^n$ wherein n is the number of bits of the test field decoded by the decoder circuits. The use of redundant decoder circuits minimizes the number of interconnections required to be made to the decoder output lines. It has been found that the use of such strategically placed decoder circuits minimizes the amount of chip area in contrast to having to distribute the output lines of a single decoder.

It will be appreciated that the arrangement of the present invention provides for a large number of possible source signal selections corresponding to the number of bus access lines times $2^n$. While not all of the possible assignments of each line may be required, the arrangement provides added flexibility in handling source signal conflicts. The number of lines included in the access bus corresponds to the maximum number of signals which can occur within a given microprocessor cycle of operation.

The novel features which are believed to be characteristic of the invention, both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

DESCRIPTION OF THE DRAWINGS

FIG. 2 shows in greater detail, the construction of the chip of FIG. 1.

DESCRIPTION OF THE PREFERRED EMBODIMENT

Figure 1:
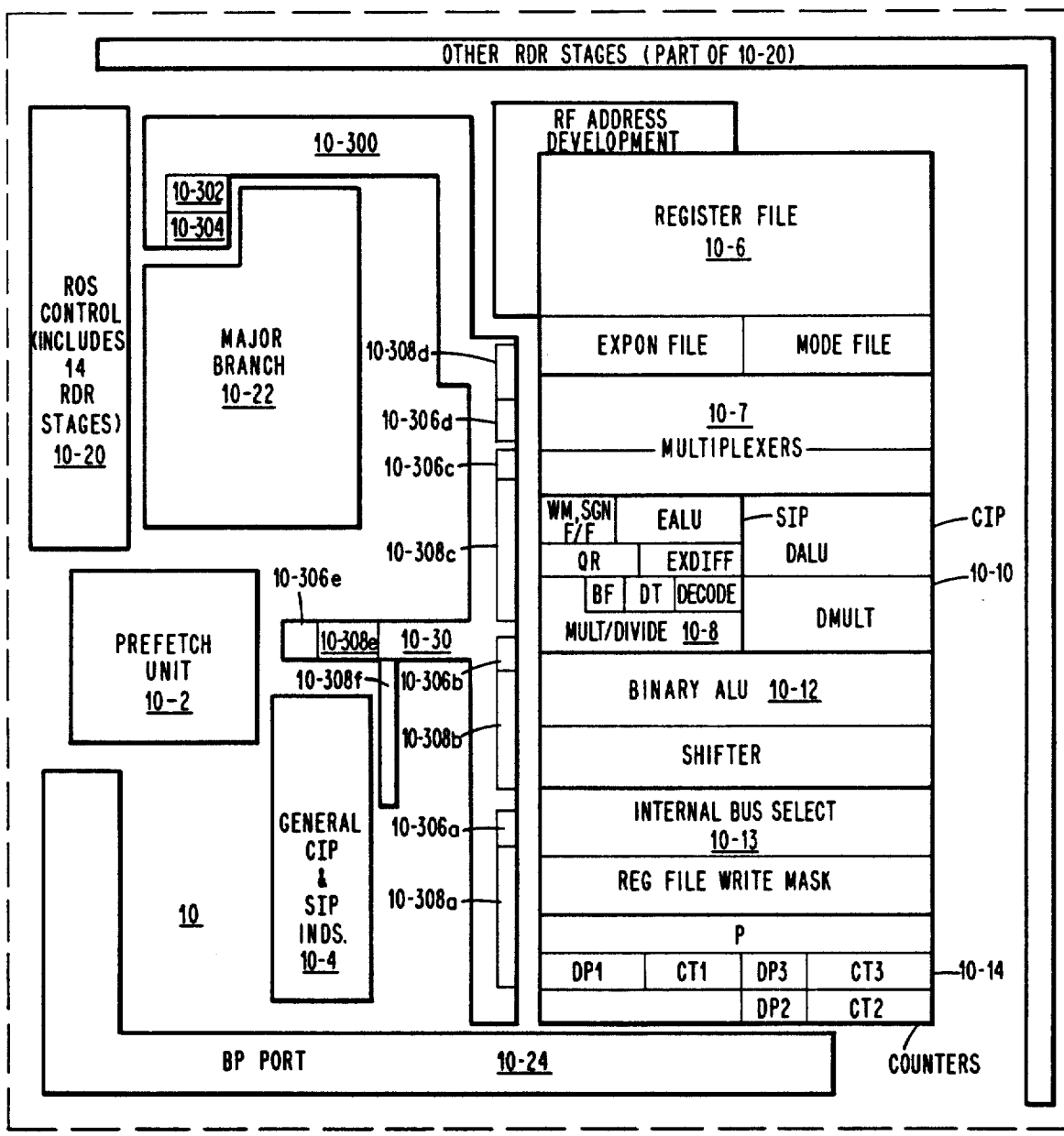
FIG. 1 is a block diagram illustrating the floor plan or layout of the chip which incorporates the teachings of the present invention.

FIG. 1 illustrates the functional layout of an integrated circuit microprocessor chip 10 which incorporates the principles of the present invention. Chip 10 includes within it a plurality of defined functional areas or sections containing the different functional elements which comprise microprocessor 10. As shown, the major functional areas or sections include a prefetch area 10-1, a general, CIP and SIP indicator area 10-4, a register file area 10-5, a SIP area 10-8, a CIP area 10-10, a binary ALU and shifter area 10-12 and a counter area 10-14. Other areas of chip 10 include the ROS control area 10-20, a major branch area 10-22, a BP port area 10-24, in addition to data selection areas 10-7 and 10-13.

The prefetch area 10-1 includes an instruction prefetch unit for prefetching instructions from a cache or main memory. The SIP area 10-8 includes a scientific instruction processor (SIP) for performing scientific operations involving floating point exponent operations, the CIP area 10-10 includes a commercial instruction processor (CIP) for performing commercial operations involving decimal operands and the binary add and shifter area 10-12 includes a binary processing unit and shifter unit for processing binary and hexadecimal operands. The indicator area 10-4 includes the indicators used by the binary, CIP and SIP processors.

The register file area 10-6 includes file addressing circuits and a plurality of register files for storing operands, exponents and work register information. The counter area 10-14 includes a program counter and five other counters used by the different processors.

Major branch area 10-22 includes a branch unit for decoding instructions. ROS control area 10-20 includes the various register flip-flops for storing the bits of each microinstruction word read out of a read only store (ROS) located off chip and the next address logic circuits for generating the ROS address specifying the next microinstruction word to be read out from the ROS and transferred to chip 10 for execution. Area 10-20 also receives signals from a pair of mode flip-flops CF6 and CF7 which store information defining the type of operation being performed by microprocessor chip 10. The CF6 and CF7 flip-flops are part of a CF (0-7) register which resides in indicator area 10-4. The CF6 and CF7 flip-flops are used by ROS control area 10-20, for purposes not related to testing, as well as by the test branch area 10-30.

In addition to the above, chip 10 of the preferred embodiment includes a test branch area 10-30. As shown, the front of this area runs vertically along functional areas 10-6 through 10-14 and has two legs which extend outward in a horizontal direction at points located near the middle and at the rear of chip 10. The first leg is located adjacent to functional areas 10-2 and 10-4 while the second leg is located near functional areas 10-20 and 10-22 as shown. The test branch area is located close to the signal sources included within the functional areas as a function of the concentration of the signals being provided by the sources. The rear portion of test branch area 10-30 is positioned close to ROS control area 10-20 which receives the final output signal provided by the selection circuits of the present invention included within area 10-30.

FIG. 2 shows in greater detail, the construction of certain portions of chip 10. The various functional areas are designated by the same reference numbers as used in FIG. 1. The various elements included within test branch area 10-30 are also outlined in FIG. 2. These elements are illustrated in schematic form in FIG. 3.

Figure 3:
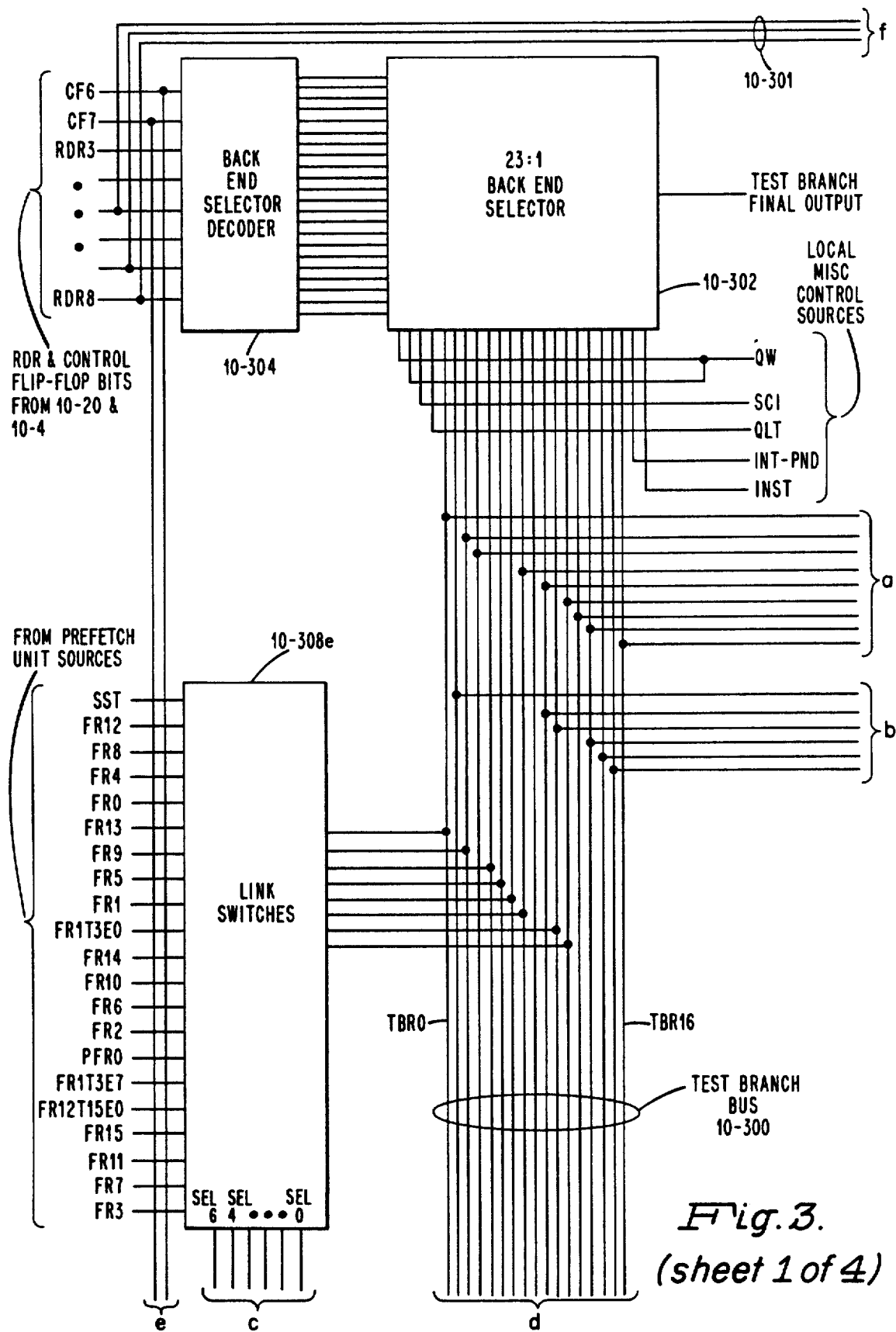
FIG. 3 shows in greater detail, the organization of the on-chip selection apparatus of the present invention.
Figure 3:
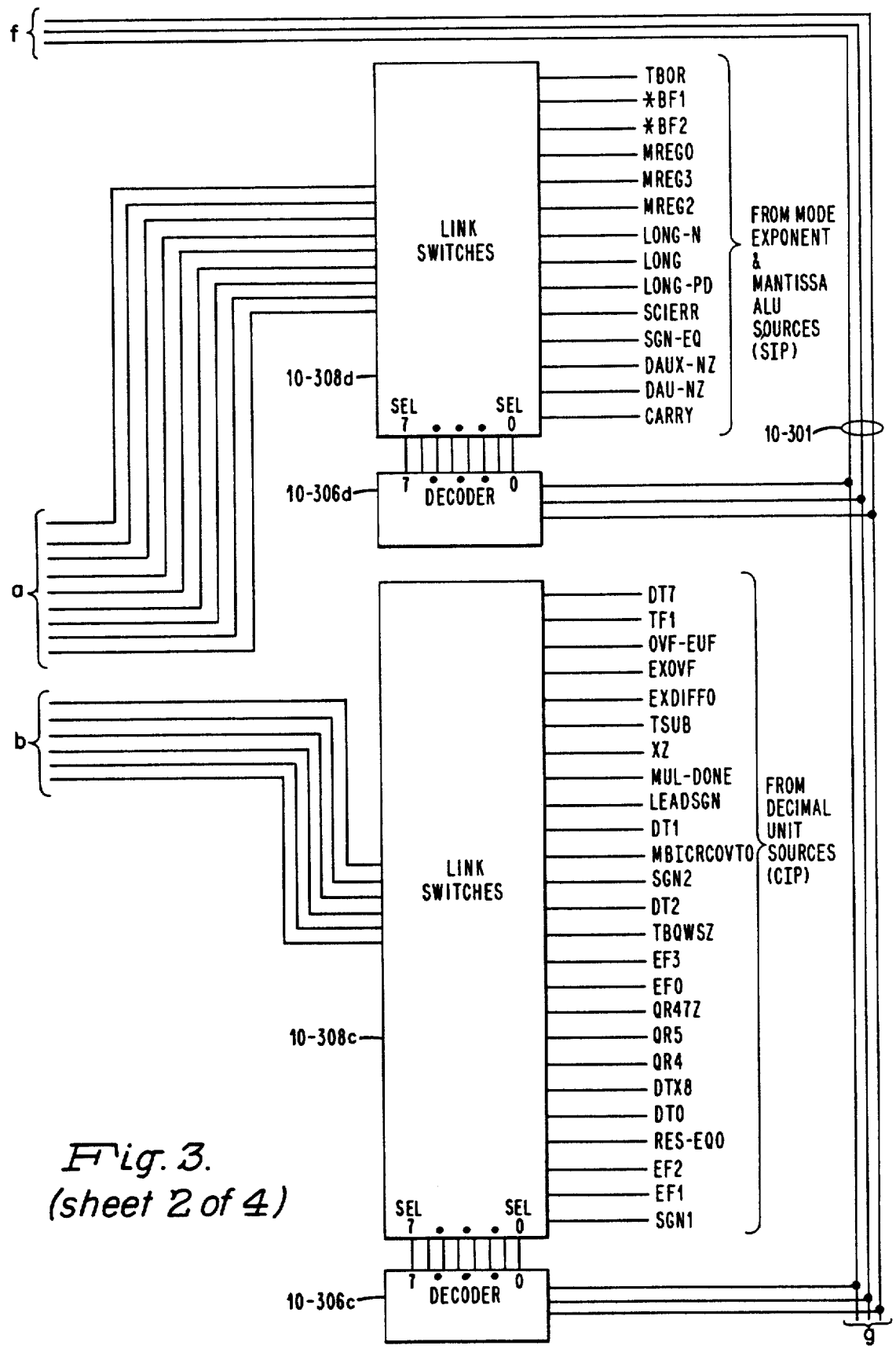

As seen from FIGS. 2 and 3, the test branch area 10-30 includes a 17 line access bus 10-300, a control bus 10-301, a back end selector circuit 10-302, a back end selector decoder circuit 10-304, a plurality of decoder circuits 10-306a through 10-306e and a plurality of linking switches 10-308a through 10-308f. A different one of the decoder circuits 10-306 is strategically located adjacent a different functional area as shown in FIG. 3. The linking switches 10-308 are positioned adjacent to each decoder close to the signal sources. These switches are used to link or connect the signal sources within a functional area to access bus 10-300. Each of the decoder circuits 10-306a through 10-306e connect in common to control bus 10-301 at different points as shown. Signals corresponding to ROS data register bits 6-8 are applied to control bus 10-301 from the flip-flop register stages of a ROS data register which are distributed along the periphery of chip 10 as shown in FIG. 1.

The back end selector 10-302 terminates access bus 10-300 as shown and is connected to receive as inputs, the outputs of selector decoder 10-304. Additionally, the selector 10-302 has additional inputs which connect to local signal sources included within major branch area 10-22. The selector decoder 10-304 is connected to receive as inputs, signals corresponding to ROS data register bits 3-8 from area 10-20 and signals equivalent to those of mode control flip-flops CF6 and CF7 from indicator area 10-4.

As seen from FIGS. 2 and 3, the arrangement of elements which comprise the on-chip selector network of the present invention simplify chip layout while at the same time are constructed so as not to affect microprocessor performance. In greater detail, with reference to FIG. 2, the lines of the access bus 10-300 and control bus 10-301 are constructed from metal lines. The line connections between the linking switches 10-308 and access bus 10-300 are constructed from polysilicide material eliminating the need for an additional chip layer while still providing the required transmission speed. The specific series of related images which represent the three dimensional pattern or topography of semiconductor chip 10 do not form a part of the present invention but are protected as a mask work under the Semiconductor Chip Protection Act of 1984.

Figure 4A:
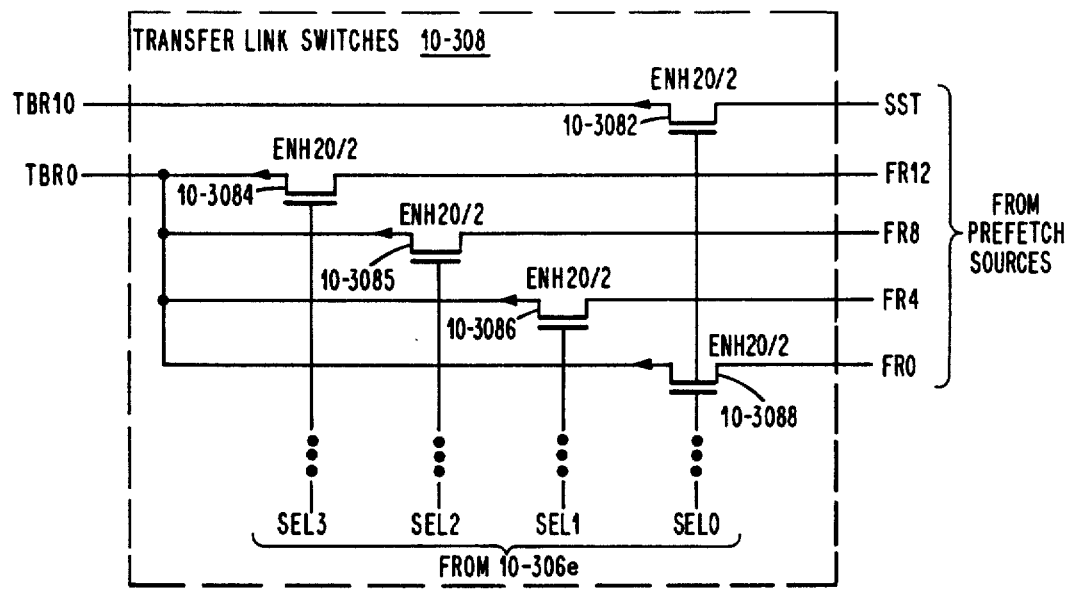
FIGS. 4a through 4d show in greater detail, different portions of the apparatus of the present invention shown in FIG. 2.

Different ones of the elements of FIGS. 2 and 3 are shown in greater detail in FIGS. 4a through 4d. More particularly, FIG. 4a shows a representative portion of link switches 10-308e which include a plurality of enhancement FET devices or pass transistors 10-3082 through 10-3088. Each FET connects or links a different source within the prefetch unit to one of the access bus lines TBR0 through TBR16. As shown, more than one source (i.e., FR0 through FR12) can be connected to the same access bus line (i.e., TBR0). The maximum number of sources which can connect to a single line is a function of the number of decoder outputs or $2^n$ where n is the number of control bus inputs. The control terminal of each pass transistor connects to one of the output terminals of its associated decoder (i.e., 10-306e).

Figure 4B:
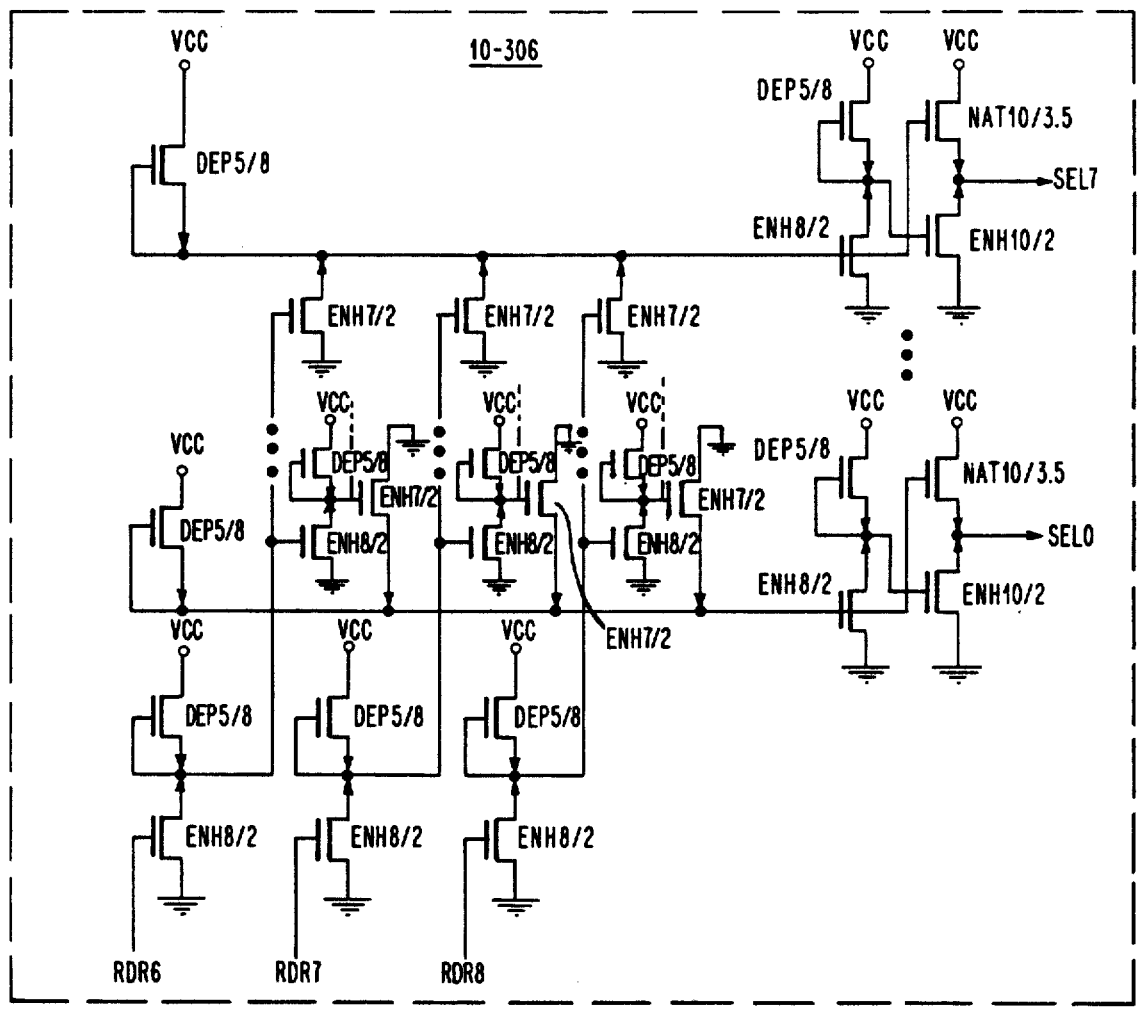

FIG. 4b illustrates a representative section of decoder 10-306. As shown, decoder 10-306 is constructed as a programmable logic array (PLA) using enhancement, native and depletion mode FETS. The signals corresponding to RDR bits 6-8 are decoded to produce an output on any one of eight output lines SEL0 through SEL7.

Figure 4C:
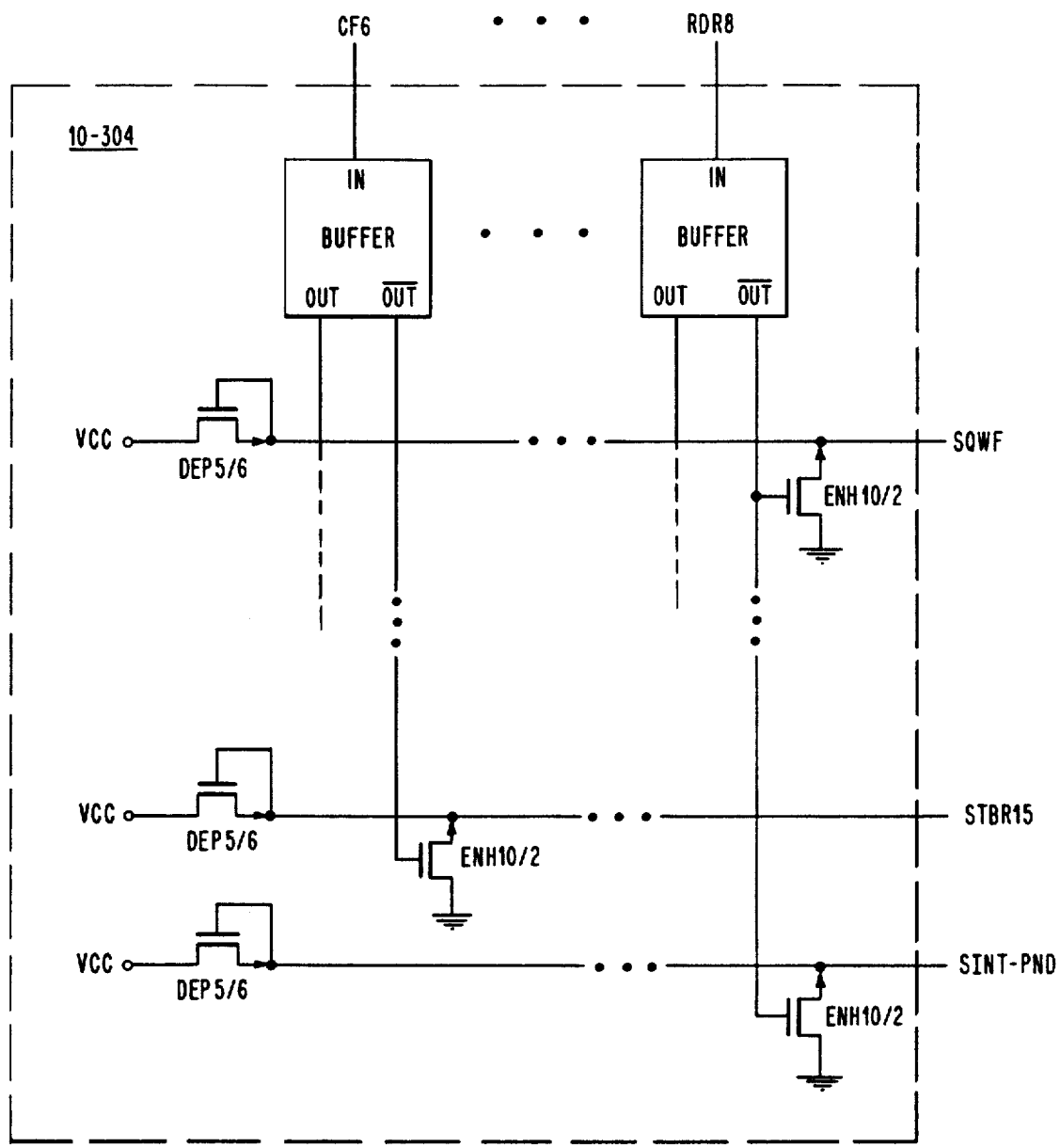

FIG. 4c illustrates the construction of selector decoder 10-304. The input signals from the mode control flip-flops and RDR register stages CF6 through RDR8 are applied to a corresponding number of input buffer circuits. These circuits produce pairs of complementary outputs which are applied to the control terminals of certain enhancement mode FETS arranged in a matrix array. The decoder 10-304 decodes the eight input signals into 23 unique outputs for enabling selector 10-302 of FIG. 4d.

Figure 4D:
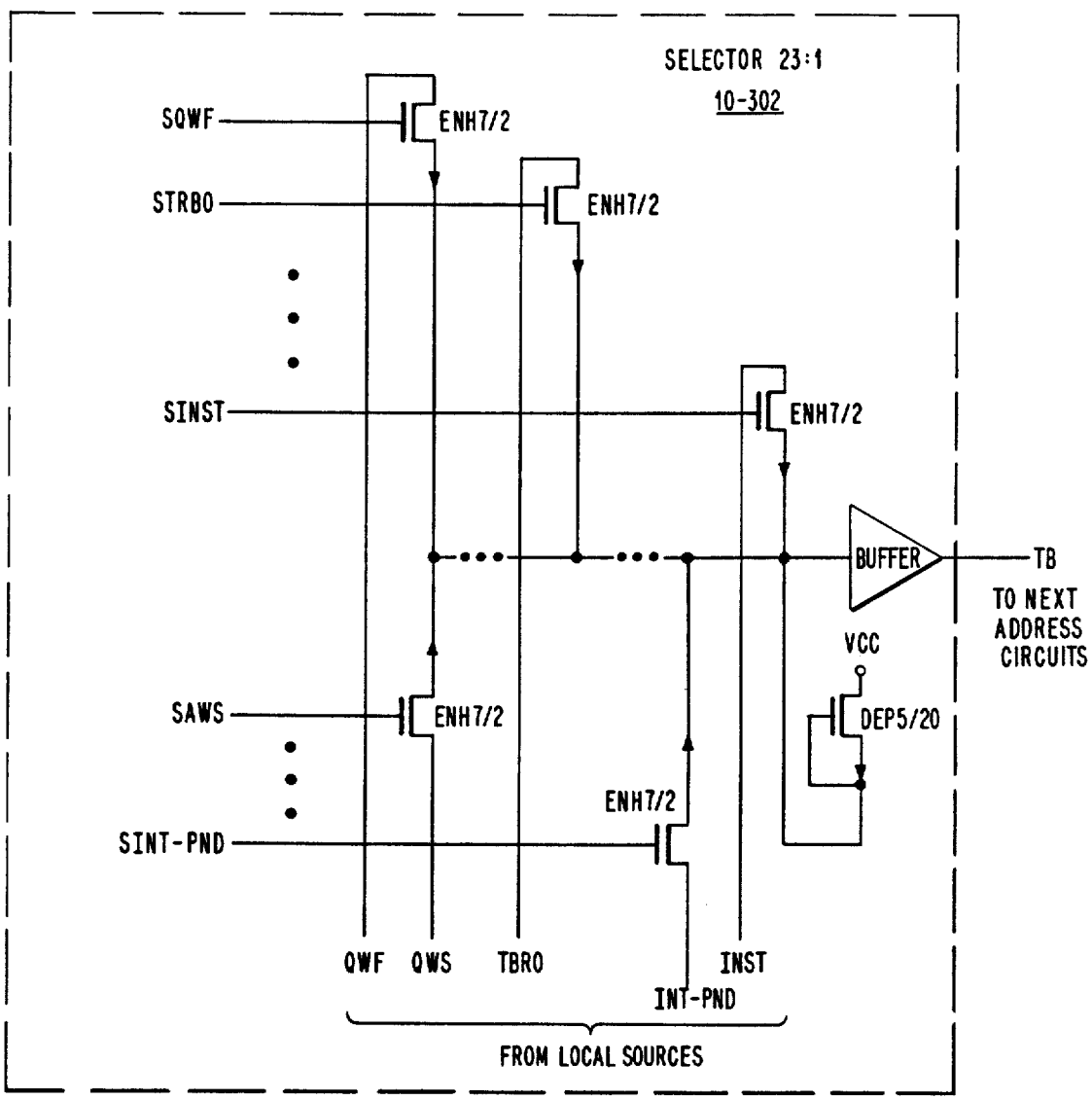

As seen from FIG. 4d, selector 10-302 includes a plurality of enhancement mode FETS, each having its control terminal connected to a different one of the outputs of selector decoder 10-304 and its drain terminal connected to either a different one of access bus lines 10-300 or one of the local sources within major branch area 10-22 as shown. The source terminal of each FET connects in common to the input of a buffer circuit which also connects to a voltage source VCC through a depletion FET as shown. The buffer circuit is connected to provide an output signal on output line TB which corresponds to the selection of a final signal source. The line TB connects as an input to the microprocessor's next address logic circuits. The numerical values included in FIGS. 4a through 4d represent the ratios selected for constructing the different FETS to meet the desired performance requirements of chip 10.

For the purpose of the present invention, the circuits shown in FIGS. 4a through 4d can also be constructed from standard integrated circuit elements.

DESCRIPTION OF OPERATION

The operation of the on-chip test selector network will now be described with particular reference to FIGS. 2 and 3 and the microinstruction word of FIG. 5. As previously mentioned, the on-chip selector of the present invention is designed to select for testing, a single condition from a large number of possible conditions. In the preferred embodiment, there are approximately 103 different conditions provided from a number of widely distributed sources which are required to be examined. From an analysis of these conditions, it was determined that a maximum of 17 conditions are required to be examined within a current cycle of operation. Accordingly, test conditions were assigned to different lines of access bus 10-300 as indicated in the following table.

| TEST CONDITION ASSIGNMENT TABLE | | | | |
|---|---|---|---|---|
| CONDITION NAME | SOURCE | CF6-CF7 STATES | TBS CODE (RDR) (3-8) | RDR 6-8 ASSIGN | LINE ASSIGNMENT |
| FR0 | PFU | 00 | 00 | 0 | TBR0 |
| FR4 | " | 00 | 01 | 1 | TBR0 |
| FR8 | " | 00 | 02 | 2 | TBR0 |
| FR12 | " | 00 | 03 | 3 | TBR0 |
| AZER002-31 | BALU | 00 | 05 | 5 | TBR0 |
| CT2(2) | CTCTRS | 00 | 07 | 7 | TBR0 |
| TF1 | CF | 00 | 08 | 0 | TBR1 |
| TF2 | " | 00 | 09 | 1 | TBR1 |
| BALUOVF | GIND | 00 | 0A | 2 | TBR1 |
| DT7 | CIP | 00 | 0B | 3 | TBR1 |
| FR1 | PFU | 00 | 10 | 0 | TBR2 |
| FR5 | " | 00 | 11 | 1 | TBR2 |
| FR9 | " | 00 | 12 | 2 | TBR2 |
| FR13 | " | 00 | 13 | 3 | TBR2 |
| *BF1 | BALU | 00 | 14 | 4 | TBR2 |
| CT2(3) | CTCTRS | 00 | 17 | 7 | TBR2 |
| CT2(5-7) = 1 | " | 00 | 18 | 0 | TBR3 |
| *BF2 | BALU | 00 | 19 | 1 | TBR3 |

-continued

TEST CONDITION ASSIGNMENT TABLE

| CONDITION NAME | SOURCE | CF6-CF7 STATES | TBS CODE (RDR) (3-8) | RDR 6-8 ASSIGN | LINE ASSIGNMENT |
|---|---|---|---|---|---|
| CARRY0 | " | 00 | 1A | 2 | TBR3 |
| TBQWSZ | CIP | 1X | 00 | 0 | TBR13 |
| DT2 | " | 1X | 01 | 1 | TBR13 |
| SGN-EQ | " | 1X | 02 | 2 | TBR13 |
| SGN2 | " | 1X | 03 | 3 | TBR13 |
| Q31RS | SHFT | 1X | 04 | 4 | TBR13 |
| DT1 | CIP | 1X | 05 | 5 | TBR13 |
| LEAD SGN | " | 1X | 06 | 6 | TBR13 |
| MBICRCOVTO | " | 1X | 07 | 7 | TBR13 |
| DPCT1Z | DPCTRS | 1X | 08 | 0 | TBR14 |
| DPCT2Z | " | 1X | 09 | 1 | TBR14 |
| DPCT3Z | " | 1X | 0A | 2 | TBR14 |
| QR4 | CIP | 1X | 0B | 3 | TBR14 |
| QR5 | " | 1X | 0C | 4 | TBR14 |
| QR47Z | " | 1X | 0D | 5 | TBR14 |
| EF0 | " | 1X | 0E | 6 | TBR14 |
| EF3 | " | 1X | 0F | 7 | TBR14 |
| SGN1 | " | 1X | 10 | 0 | TBR15 |
| EF1 | " | 1X | 11 | 1 | TBR15 |
| EF2 | " | 1X | 12 | 2 | TBR15 |
| RES-EQ0 | " | 1X | 13 | 3 | TBR15 |
| DT0 | " | 1X | 14 | 4 | TBR15 |
| DTX8 | " | 1X | 15 | 5 | TBR15 |
| MBCTDP21 | DPCTRS | 1X | 16 | 6 | TBR15 |
| MBCTDP20 | " | 1X | 17 | 7 | TBR15 |
| MBCT3SZ1 | CTCTRS | 1X | 18 | 0 | TBR16 |
| CARRY | BALU | 1X | 19 | 1 | TBR16 |
| DAU-NZ | CIP | 1X | 1A | 2 | TBR16 |
| DAUX-NZ | " | 1X | 1B | 3 | TBR16 |
| LONG-PD | SIP | X1 | 00 | 0 | TBR9 |
| LONG | " | X1 | 01 | 1 | TBR9 |
| LONG-N | " | X1 | 02 | 2 | TBR9 |
| NRML | BALU | X1 | 03 | 3 | TBR9 |
| EXOVF | SIP | X1 | 04 | 4 | TBR9 |
| OVF-EUF | " | X1 | 05 | 5 | TBR9 |
| MREG2 | MF | X1 | 06 | 6 | TBR9 |
| MREG3 | " | X1 | 07 | 7 | TBR9 |
| MUL-DONE | SIP | X1 | 09 | 1 | TBR10 |
| BITNRM | SHFT | X1 | 0A | 2 | TBR10 |
| XZ | SIP | X1 | 0B | 4 | TBR10 |
| TSUB | " | X1 | 0D | 5 | TBR10 |
| EXDIFF(0) | " | X1 | 0E | 6 | TBR10 |
| FR1 | PFU | X1 | 10 | 0 | TBR11 |
| FR8 | " | X1 | 11 | 1 | TBR11 |
| KOP | CF | X1 | 13 | 3 | TBR11 |
| *BF1 | BALU | X1 | 14 | 4 | TBR11 |
| CT2(3) | CTCTRS | X1 | 17 | 7 | TBR11 |
| CT2(5-7) = 1 | " | X1 | 18 | 0 | TBR12 |
| *BF2 | BALU | X1 | 19 | 1 | TBR12 |
| CARRY0 | " | X1 | 1A | 2 | TBR12 |
| CF1 | GIND | XX | 1E | 6 | TBR4 |
| CF2 | " | XX | 1F | 7 | TBR4 |
| FR2 | PFU | XX | 20 | 0 | TBR5 |
| FR6 | " | XX | 21 | 1 | TBR5 |
| FR10 | " | XX | 22 | 2 | TBR5 |
| FR14 | " | XX | 23 | 3 | TBR5 |
| CFX5 | GIND | XX | 24 | 4 | TBR5 |
| CFX6 | " | XX | 26 | 6 | TBR5 |
| Q31 | SHFT | XX | 27 | 7 | TBR5 |
| TF0 | CF | XX | 28 | 0 | TBR6 |
| CT3ZR0 | CTCTRS | XX | 29 | 1 | TBR6 |
| *CF7 | GIND | XX | 2B | 3 | TBR6 |
| FR(1-3) = 7 | PFU | XX | 2C | 4 | TBR6 |
| IX2 | GIND | XX | 2D | 5 | TBR6 |
| PFR0 | PFU | XX | 2E | 6 | TBR6 |
| CF3 | GIND | XX | 2F | 7 | TBR6 |
| FR3 | PFU | XX | 30 | 0 | TBR7 |
| FR7 | " | XX | 31 | 1 | TBR7 |
| FR11 | " | XX | 32 | 2 | TBR7 |
| FR15 | " | XX | 33 | 3 | TBR7 |
| FR12T15E0 | " | XX | 34 | 4 | TBR7 |
| MREG0 | MF | XX | 35 | 5 | TBR7 |
| CT2(4) | CTCTRS | XX | 36 | 6 | TBR7 |
| CT2(4-7) = 0 | " | XX | 37 | 7 | TBR7 |
| TF7 | CF | XX | 38 | 0 | TBR8 |
| TF6 | " | XX | 39 | 1 | TBR8 |
| TF8 | " | XX | 3A | 2 | TBR8 |

-continued

TEST CONDITION ASSIGNMENT TABLE

| CONDITION NAME | SOURCE | CF6-CF7 STATES | TBS CODE (RDR) (3-8) | RDR 6-8 ASSIGN | LINE ASSIGNMENT |
|---|---|---|---|---|---|
| TF9 | " | XX | 3B | 3 | TBR8 |
| ALUZEROF | BALU | XX | 3C | 4 | TBR8 |
| IX3 | GIND | XX | 3D | 5 | TBR8 |
| CF4 | " | XX | 3F | 7 | TBR8 |
| SCIERR | SIP | X1 | 12 | 2 | TBR11 |
| FR(1-3) = 0 | PFU | XX | 1C | 4 | TBR4 |
| INDEX-ODD | CTCTRS | XX | 2A | 2 | TBR6 |
| TBOR | SIP | 00 | 04 | 4 | TBR0 |
| SST | PFU | X1 | 08 | 0 | TBR10 |

The above abbreviations are used to designate the following functional units:

| | |
|---|---|
| Prefetch Unit = | PFU |
| Gen, Indicators = | GIND |
| CT Counters = | CTCTRS |
| Mode File = | MF |
| Binary ALU = | BALU |
| DP Counters = | DPCTRS |
| Shifter = | SHFT |
| Commercial Inst. Proc. = | CIP |
| Scientific Inst. Proc. = | SIP |
| Control Flops = | CF |

*Designates negation of signal.

In accordance with the present invention, each line of access bus 10-300 is arranged to be selected as a function of the states of mode control flip-flops CF6 and CF7 and RDR bits 3-6. The selection of these lines is accomplished as shown in the following table.

TEST SELECTION CODING TABLE

| CF6 | CF7 | RDR3 | RDR4 | RDR5 | RDR6 | ACCESS LINE SELECTED |
|---|---|---|---|---|---|---|
| 0 | 0 | 0 | 0 | 0 | X | TBR0 |
| 0 | 0 | 0 | 0 | 1 | X | TBR1 |
| 0 | 0 | 0 | 1 | 0 | 0 | TBR2 |
| 0 | 0 | 0 | 1 | 1 | 0 | TBR3 |
| X | X | 0 | 1 | 1 | 1 | TBR4 |
| X | X | 1 | 0 | 0 | X | TBR5 |
| X | X | 1 | 0 | 1 | X | TBR6 |
| X | X | 1 | 1 | 0 | X | TBR7 |
| X | X | 1 | 1 | 1 | X | TBR8 |
| X | 1 | 0 | 0 | 0 | X | TBR9 |
| X | 1 | 0 | 0 | 1 | X | TBR10 |
| X | 1 | 0 | 1 | 0 | X | TBR11 |
| X | 1 | 0 | 1 | 1 | 0 | TBR12 |
| 1 | X | 0 | 0 | 0 | X | TBR13 |
| 1 | X | 0 | 0 | 1 | X | TBR14 |
| 1 | X | 0 | 1 | 0 | X | TBR15 |
| 1 | X | 0 | 1 | 1 | 0 | TBR16 |

Figure 5:
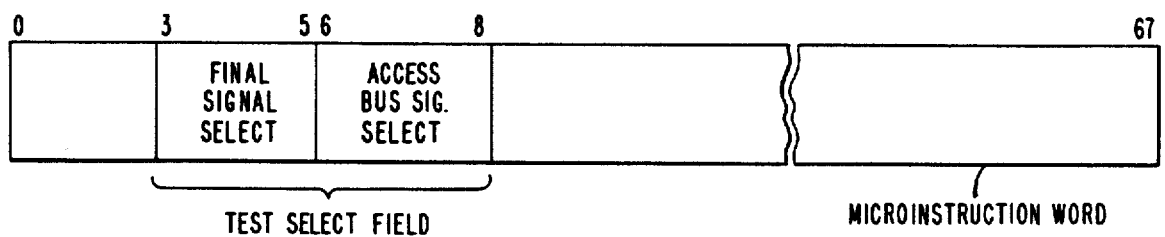
FIG. 5 shows the microinstruction word format used in conjunction with the present invention.

During each cycle of operation, the off-chip ROS reads out a 67-bit microinstruction word which includes a test selection field shown in FIG. 5. This word is transferred to the RDR register stages within chip 10.

RDR bits 6-8 are applied to the lines of control bus 10-301.

In response to the states of RDR bits 6-8, each of the decoders 10-306a through 10-306e is identically enabled to force the same one of its output terminals to a binary ONE state. This in turn enables each of the FET pass transistors connected to that decoder output terminal within each of the linking switches 10-308a through 10-308f to connect its associated signal source to a corresponding one of the access bus lines TBR0 through TBR16. The conditions are assigned so that only one source is enabled to provide a signal to an access bus line even when more than one source is connected to the same line.

The signals from the selected sources are transmitted along bus 10-300 and are received by back end selector 10-302 as seen from FIG. 3. At this time, signals from local sources are also applied to other inputs of selector 10-302. The selector decoder 10-304 is conditioned by another portion of the test field of the microinstruction word of FIG. 5 which corresponds to RDR bits 3-5 and the states of control flip-flops CF6 and CF7 to select the access bus line and connected signal source which is to provide the final output signal to be tested.

For example, when RDR bits 6-8 have the value c02," decoder 10-306e causes one of the pass transistors of linking switches 10-308e to connect as a source, register stage FR8 of the microprocessor's prefetch unit to line TBR0. At the same time, decoder 10-306e causes an overflow flip-flop BALUOVF to be connected as a source to line TBR1. The other sources assigned the value "02" are also connected to the lines as specified in the line assignment table.

When states of mode control flip-flops CF6 and CF7 are 00 and RDR bits 3-5 are also ZEROS, selector 10-302 is enabled to select line TBR0 as shown in the select code table. As seen from this table, the state of RDR bit 6 is used only in four cases where there are condition conflicts. The other RDR bits 7 and 8 are used in the selection of signals from the local sources contained in major branch area 10-22. The selection is made as illustrated in the following table.

| CF6 | CF7 | RDR3 | RDR4 | RDR5 | RDR6 | RDR7 | RDR8 | LOCAL SOURCE |
|---|---|---|---|---|---|---|---|---|
| X | X | 1 | 1 | 1 | 1 | 1 | 0 | INST |
| X | X | 0 | 1 | 1 | 1 | 0 | 1 | SCI |
| X | X | 1 | 0 | 0 | 1 | 0 | 1 | INT-PND |
| X | 1 | 0 | 1 | 0 | 1 | 0 | 1 | SQWF |
| 0 | X | 0 | 1 | 0 | 1 | 0 | 1 | SQWS |
| 0 | 0 | 0 | 0 | 0 | 1 | 1 | 0 | QLT. |

From the above, it is seen how the present invention is able to provide on-chip selection of test conditions based upon signals received from a large number of sources widely distributed over the area of a microprocessor chip. The invention by employing redundant decoders strategically placed within different functional areas of the chip reduces the amount of chip area devoted to interconnections. The buses and the lines connecting the signal sources utilized by the invention are selected so as to maximize microprocessor performance.

It will be obvious to those skilled in the art that many changes may be made to the preferred embodiment. For example, the locations and number of decoders and other elements of the selector of the present invention may be varied as a function of the chip's organizaton and the type of signals being selected for testing.

While in accordance with the provisions and statutes there has been illustrated and described the best form of the invention, certain changes may be made without departing from the spirit of the invention as forth in the appended claims and that in some cases, certain features of the invention may be used to advantage without a corresponding use of other features.

What is claimed is:

1. A LSI microprocessor chip having an area including a plurality of functional areas containing a plurality of sources and on-chip apparatus for selecting signals from said plurality of sources, said on-chip apparatus comprising:
   a plurality of decoder circuit means, each decoder circuit means being located at a different predetermined position on said chip, said different predetermined position being adjacent to at least one of said functional areas;
   an access bus having a predetermined number of lines, said bus being distributed throughout said area of said chip as a function of said signals provided by the sources according to how said signals are concentrated on said chip;
   a number of pluralities of transistor switching means, each plurality of said switching means being connected to one of said decoder circuit means located closest thereto, to said plurality of sources of an adjacent functional area and to selected ones of said access bus lines;
   a control bus having a plurality of lines distributed and connected to each of said decoder circuit means for simultaneously applying a set of control signals to said plurality of decoder circuit means; and,
   final selection circuit means connected to terminate said access bus lines, said selection circuit means being located adjacent to one of said functional areas which is to receive an output signal from said final selection circuit means, said plurality of decoder circuit means being simultaneously enabled by said set of control signals to transmit signals from said sources contained within said plurality of functional areas on said lines of said access bus to said final selection circuit means for accomplishing the final selection of an output signal.

2. The chip of claim 1 wherein said apparatus further includes:
   selector decoder means being located adjacent to said selection circuit means and adjacent to said one of said functional areas, said selector decoder means being connected to said final selection circuit means and to receive control signals including said set of control signals and said selector decoder means in response to said control signals, enabling said final selection circuit means to select said output signal from one of said large number of sources selected for connection to said predetermined number of lines of said access bus for application to said one of said functional areas.

3. The chip of claim 2 wherein said one of said functional areas includes address generation logic circuit means and said predetermined number of lines corresponds to a maximum number of conditions which are required to be tested within a microprocessor cycle of operation for the generation of a next address by said address generation logic circuit means as a function of said output signal.

4. The chip of claim 1 wherein each of said decoder circuit means has a plurality of outputs, said plurality corresponding to a maximum number of different source signals which are assigned to each of said predetermined number of access bus lines and wherein said apparatus further includes conductor means for selectively connecting predetermined ones of said outputs of said decoder circuit means to different ones of said transistor switching means for applying signals from corresponding ones of said sources to said bus access lines for testing without conflict conditions within said functional areas.

5. The chip of claim 4 wherein each of transistor switching means include a FET pass transistor having input and a pair of output terminals, each input terminal being connected to a different one of said decoder outputs and a different one of said pair of output terminals being connected to one of said access bus lines and to one of said sources respectively, said pass transistor in response to an enabling signal from said decoder circuit means, connecting said one of said sources to said one of said access bus lines to enable testing of a condition generated by said one of said sources.

6. The apparatus of claim 5 wherein said apparatus further includes a corresponding number of conductor lines, each conductor line connecting said different one of said output terminals to said sources.

7. The apparatus of claim 6 wherein each of said number of conductor lines consists essentially of polysilicide material.

8. The apparatus of claim 1 wherein said lines of said access and control bus consists essentially of metal material.

9. The chip of claim 2 wherein said final selection circuit means is located adjacent to another one of said functional areas which includes a plurality of local sources, said selection circuit means having a first plurality of inputs, each input connected to a different one of said access bus lines and a second plurality of inputs, each input being connected to a different one of said plurality of local sources, said final selection circuit means being enabled by said control signals to select said output signal from said plurality of local sources in addition to said sources connected to said access bus.

10. The chip of claim 9 wherein said another one of said functional areas contains branching circuits.

11. The chip of claim 1 wherein said access bus lines are distributed over a predetermined rectangular shaped area extending from front to back of said chip.

12. The chip of claim 11 wherein said rectangular shaped area corresponds to a test branch area which is elongated and extended so as to be positioned close to said plurality of functional areas.

13. On-chip apparatus for selecting signals from a predetermined number of sources included within an area of an LSI microprocessor chip, said chip area including a plurality of functional areas containing a different plurality of said sources and said on-chip apparatus comprising:
   a plurality of decoders, each decoder being located at a different predetermined position on said chip, said different predetermined position being adjacent to at least one of said functional areas;
   an access bus having a predetermined number of lines, said bus being distributed throughout the area of said chip as a function of signals provided by the sources and their concentration on said chip;
   a number of pluralities of transistor switches, each plurality of said switches being connected to one of said decoders located closest thereto, to said predetermined number of sources of an adjacent functional area and to selected ones of said access bus lines;
   a control bus having a plurality of lines distributed and connected to each of said decoders for simultaneously applying a set of control signals to said plurality of decoders; and,
   a final selection circuit connected to terminate said access bus lines and provide a selected output signal, said selection circuit being located adjacent to one of said functional areas which is to receive said selected output signal, said plurality of decoders being simultaneously enabled by said set of control signals to transmit signals from said sources contained within said plurality of functional areas on said lines of said access bus to said final selection circuit for accomplishing the final selection of said selected output signal.

14. The apparatus of claim 13 wherein said apparatus further includes:
   a selector decoder being located adjacent to said selection circuit and adjacent to said one of said functional areas, said selector decoder being connected to said final selection circuit and to receive control signals including said set of control signals and said selector decoder in response to said control signals, enabling said final selection circuit to select said output signal from one of said predetermined number of sources selected for connection to said predetermined number of lines of said access bus for application to said one of said functional areas.

15. The apparatus of claim 14 wherein said one of said functional areas includes address generation logic circuit means and said predetermined number of lines corresponds to a maximum number of conditions which are required to be tested within a microprocessor cycle of operation for the generation of a next address by said address generation logic circuit means as a function of said output signal.

16. The apparatus of claim 13 wherein each of said decoders has a plurality of outputs, said plurality corresponding to a maximum number of different source signals which are assigned to each of said predetermined number of access bus lines and wherein said apparatus further includes conductor means for selectively connecting predetermined ones of said outputs of each of said decoders to different ones of said transistor switches for applying signals from corresponding ones of said sources to said bus access lines for testing without conflict conditions within said functional areas.

17. The apparatus of claim 16 wherein each of transistor switches include a FET pass transistor having input and a pair of output terminals, each input terminal being connected to a different one of said decoder outputs and a different one of said pair of output terminals being connected to one of said access bus lines and to one of said sources respectively, said pass transistor in response to an enabling signal from said decoder, connecting said one of said sources to said one of said access bus lines to enable testing of a condition generated by said one of said sources.

18. The apparatus of claim 17 wherein said apparatus further includes a corresponding number of conductor lines, each conductor line connecting said different one of said output terminals to said sources.

19. The apparatus of claim 18 wherein each of said number of conductor lines consists essentially of polysilicide material.

20. The apparatus of claim 13 wherein said lines of said access and control bus consists essentially of metal material.

21. The apparatus of claim 14 wherein said final selection circuit is located adjacent to another one of said functional areas which includes a plurality of local sources, said selection circuit having a first plurality of inputs, each input connected to a different one of said access bus lines and a second plurality of inputs, each input being connected to a different one of said plurality of local sources, said final selection circuit being enabled by said control signals to select said output signal from said plurality of local sources in addition to said sources connected to said access bus.

22. The apparatus of claim 21 wherein said another one of said functional areas contains branching circuits.

23. The apparatus of claim 13 wherein said access bus lines are distributed over a predetermined rectangular shaped area extending from front to back of said chip.

24. The apparatus of claim 23 wherein said rectangular shaped area corresponds to a test branch area which is elongated and extended so as to be positioned close to said plurality of functional areas.

25. A method of selecting signals from a large number of sources distributed throughout an area of an LSI microprocessor chip, said method comprising the steps of:
   (1) dividing a portion of the area of said chip into a plurality of functional areas;
   (2) locating a plurality of decoders on said chip so that a different decoder is located adjacent to at least one of said functional areas;
   (3) distributing a predetermined number of lines of an access bus to the sources throughout said area of said chip as a function of signals provided by the sources within said functional areas according to how said signals are concentrated;
   (4) locating a number of pluralities of switches near said different decoder for linking said sources to said access bus lines;
   (5) distributing a number of lines of a control bus to each of said decoders within each functional area for simultaneously applying a set of control signals to said plurality of decoders;
   (6) locating a final selection circuit adjacent to one of said functional areas containing circuits connected to receive an output selected signal from said selection circuit for terminating said lines of said access bus; and, (7) simultaneously enabling said plurality of decoders by said control signals to transmit signals from said sources contained within said plurality of functional areas lines of said access bus to said final selection circuit for the final selection of an output signal by said selection circuit.

26. The method of claim 25 wherein said method further includes the steps of locating on said chip a selector decoder adjacent to said selection circuit;

connecting said selector decoder to said control bus and to said selection circuit; and, enabling said selector decoder to cause said selection circuit to make said final selection.

27. The method of claim 26 wherein said selection circuit couples to next address generation logic circuit means, said method further including the step of enabling said next address generation logic circuit means to generate a next address defined by a selected one of a large number of conditions designated by said signals transmitted by said sources.

28. The method of claim 25 wherein said method further includes the step of widely distributing said sources throughout said chip area.

29. The method of claim 26 wherein said chip further includes a register for storing at least a portion of a microinstruction word, said microinstruction word including a test condition field, a first portion of said field being coded to specify conditions to be selected from the sources associated therewith, said method further including the step of applying signals of said first portion to said control bus for enabling said decoders to apply signals to said predetermined number of lines from designated ones of said sources.

30. The method of claim 29 wherein said chip further includes indicator means for defining a type of operation being performed by said chip and a second portion of said test condition field being coded to specify conditions for final selection by said final selection circuit, said method further including the step of enabling said selector decoder by signals from said indicator means, said first and second portions of said field to select a single condition for testing.

31. The method of claim 30 wherein said first and second portions are programmable to specify mutually exclusive conditions.

* * * * *